United States Patent [19]

Yamaguchi et al.

[11]  4,171,494
[45]  Oct. 16, 1979

[54] ELECTRIC ROTARY MACHINE HAVING SUPERCONDUCTING ROTOR

[75] Inventors: Kiyoshi Yamaguchi, Hitachi; Naoki Maki, Naka; Takanobu Mori, Hitachi, all of Japan

[73] Assignee: Hitachi, Ltd., Japan

[21] Appl. No.: 821,233

[22] Filed: Aug. 2, 1977

[30] Foreign Application Priority Data

Aug. 11, 1976 [JP]  Japan .................................. 51-95600

[51] Int. Cl.$^2$ .............................................. H02K 9/00
[52] U.S. Cl. ....................................... 310/52; 310/261
[58] Field of Search ......................... 310/10, 40, 52, 54, 310/261, 264, 265, 64; 336/DIG. 1

[56] References Cited

U.S. PATENT DOCUMENTS

| | | | |
|---|---|---|---|
| 3,679,920 | 7/1972 | MacNab | 310/10 |
| 3,742,265 | 6/1973 | Smith | 310/52 |
| 3,942,053 | 3/1976 | Abolins | 310/52 |
| 3,956,648 | 5/1976 | Kirtley | 310/10 |
| 4,017,755 | 4/1977 | Litz | 310/52 |
| 4,020,371 | 4/1977 | Gillet | 310/52 |
| 4,039,870 | 8/1977 | Sterrett | 310/52 |
| 4,042,846 | 8/1977 | Sterrett | 310/52 |
| 4,056,745 | 11/1977 | Eckels | 310/52 |
| 4,063,122 | 12/1977 | Kullmann | 310/10 |
| 4,076,988 | 2/1978 | Litz | 310/10 |
| 4,092,555 | 5/1978 | Ying | 310/52 |
| 4,117,357 | 9/1978 | Baumann | 310/52 |

Primary Examiner—R. Skudy
Attorney, Agent, or Firm—Craig and Antonelli

[57] ABSTRACT

An electric rotary machine having a superconducting rotor, such as a dynamoelectric machine. A cylindrical shielding member is provided for protecting the superconducting winding from the influence of the magnetic flux of the stator, and for shielding the heat radiated from the normal-temperature side of the machine, thereby maintaining the superconducting winding at an extremely low temperature. An inner reinforcing body and an outer reinforcing body are fitted to the inner and the outer peripheral surfaces of the cylindrical shielding member so as to reinforce the latter. These reinforcing bodies are effective to reduce the stress in the rotor caused by the centrifugal force and electromagnetic force during a running of the electric rotary machine, thereby protecting the shielding member against breakage and/or deformation.

7 Claims, 5 Drawing Figures

ELECTRIC ROTARY MACHINE HAVING SUPERCONDUCTING ROTOR

BACKGROUND OF THE INVENTION

The present invention relates to electric rotary machines such as dynamoelectric machines and, more particularly, to electric rotary machines having a rotor provided with a superconducting winding, i.e. a superconducting rotor.

In general, superconducting rotors are used in so-called superconducting condition in which the field winding is kept under an atmosphere of extremely low temperature of, for example, 20° K., so that the resistance in the winding may be largely reduced.

In order to protect this superconducting winding at the superconducting condition from influences of magnetic flux of the stator, and in order to keep the extremely low temperature atmosphere against the radiated heat, a cylindrical shielding body is provided around the superconducting field winding. It is strictly required to protect the superconducting winding against the alternating magnetic flux, since the superconducting condition is easily broken by an invasion by an alternating magnetic flux of several Hz from the stator side.

For this reason, the shielding body must be made of a material having a sufficiently low electric resistance, e.g. pure copper, silver or aluminum.

However, unfortunately, these conductive materials in general exhibit a small yield point and Young's modulus, so that there remains a fear that the shielding body may be plastically or permanently deformed due to a centrifugal force, when the rotor is rotated at a high speed of, for example, 3600 r.p.m. To avoid such a deformation, it has been proposed to closely fit a cylindrical reinforcing body of a material having a large Young's modulus and a high strength to the outer peripheral surface of the shielding body, so that the shielding body is capable of withstanding the centrifugal force. (For information, structures of this kind are shown in FIGS. 1 thru 3 of U.S. Pat. No. 3,679,920).

In addition to the centrifugal force, the shielding body is often subjected to an extremely large electromagnetic force, in case of a failure or accident in the dynamo itself or in the exterior power transmission system, which is superimposed to the centrifugal force. The electromagnetic force follows a sine wave curve-spreading in and out of the shielding body, so that the shielding body is subjected to a bending force to cause deformation thereof in the direction opposite to the electromagnetic force.

Therefore, when a pure conductive material is used for the shielding body, the shielding body, in the form of a cylinder, as a whole is apt to be buckled due to excessively large deformation, and a small Young's modulus of the material.

The tendency of the buckling will be reduced by positioning the externally provided reinforcing body at the inside of the shielding member, in close fitting relationship to the latter. The resistance against the centrifugal force will be also increased, when the fitting surfaces of the cylindrical reinforcing body and the shielding member are adhered to each other.

For the bending force, the stress gets larger in proportion to the distance from the neutral line of the bending, so that the maximum stress appears in the peripheral surface of the shielding body. This maximum stress becomes considerably large, when the shielding body and the cylindrical reinforcing body of different materials are superimposed or laminated, because the neutral surface of bending exists in the reinforcing body, presenting a potential for breakage of the shielding body.

The same potential would be caused by positioning a cylindrical reinforcing body on the outer peripheral surface of the shielding body with close fitting by means of adhesion of the fitting surfaces.

SUMMARY OF THE INVENTION

It is therefore an object of the present invention to provide an electric rotary machine having a superconducting rotor in which the stress in the shielding body is conveniently diminished.

It is another object of the present invention to provide an electric rotary machine having a superconducting rotor in which the shielding member is protected simultaneously from the centrifugal force and the electromagnetic force.

To these ends, according to the present invention, an electric rotary machine is provided in which the shielding member of an inferior mechanical strength is reinforced from inside and the outside thereof by means of respective reinforcing bodies.

These and other objects, as well as advantageous features of the present invention will become more clear from the following description of preferred embodiments when taken in conjunction with the accompanying drawings.

DETAILED DESCRIPTION OF PREFERRED EMBODIMENTS

Figure 1:
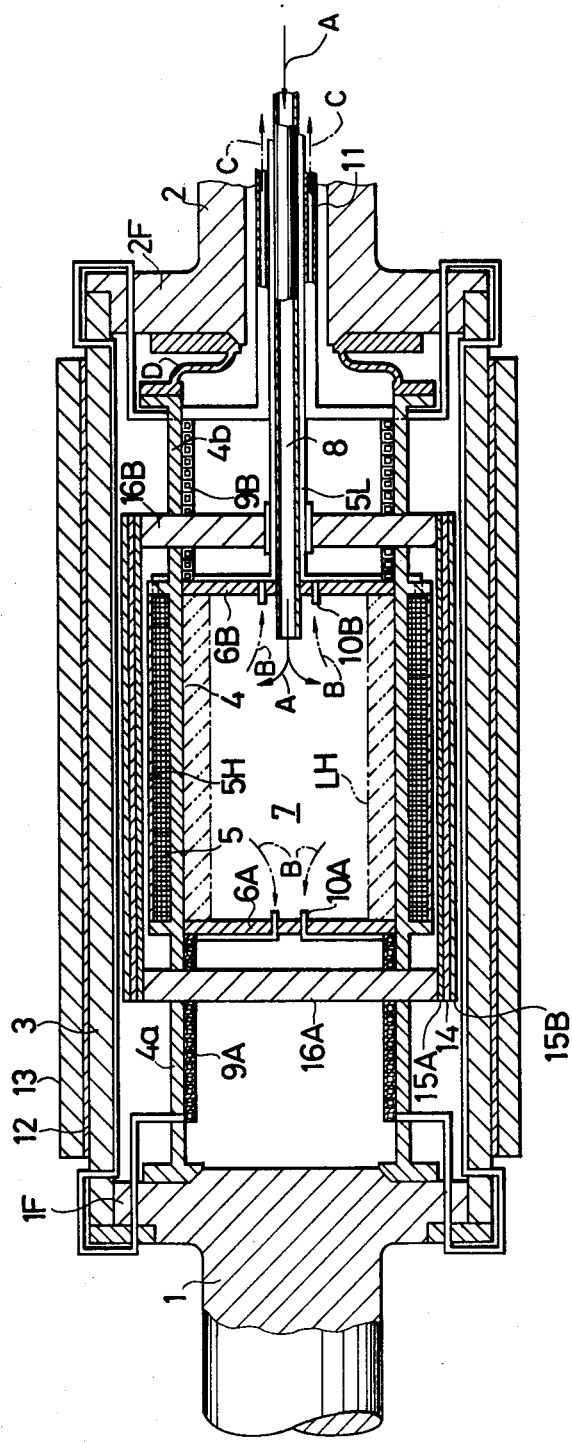
FIG. 1 is a sectional view of a superconducting rotor embodying the present invention.

Referring at first to FIG. 1, a superconducting rotor of an A.C. generator, is generally constituted by a rotor shaft, a field winding 5 and a circuit for a coolant for preserving the field winding 5 at an extremely low temperature of below 20° K.

The rotor shaft is of a split type and includes a driving shaft 1 for transmitting a driving torque from a primary mover such as a gas turbine, steam turbine or a hydraulic turbine, a hollow shaft 2 for passing the coolant circuit and in which is arranged a power lead 5L which will be discussed more fully hereinafter.

These shafts 1 and 2 have respective flanges 1F and 2F at their opposing ends, and confront each other with a predetermined gap therebetween.

A rotor constructing member 3 for constructing a rotor bridges the flanges 1F and 2F, so as to join the flanges 1F and 2F to each other. At the inside of the rotor constructing member 3, disposed concentrically therewith is a torque tube 4 which also bridges the flanges 1F and 2F. Namely, one side of the torque tube 4 is connected with the flange 1F at one end portion 4a, and the other side of the torque tube 4 is connected with the flange 2F at an end portion through, for example, a disk D for absorbing thermal-deformations. The rotor constructing member 3 can be dispensed with if the torque tube 4 has a mechanical strength sufficiently large to form the rotor. Thus, the torque tube 4 also may perform the function of the rotor constructing member 3.

At the outside of the torque tube 4, is disposed the field winding 5 for torque transmission from the driving shaft 1. The peripheral surface of the field winding 5 is held by a non-magnetic holding sleeve 5H. A power lead 5L, passing through the hollow shaft 2, is connected to the field winding 5 for power supply thereto from an external electric power source (not shown).

The torque tube 4 forms, within the axial length of the field winding 5, a pool 7 of coolant by means of partitions 6A and 6B. A coolant supply tube 8, extending through the hollow shaft 2, has one end which opens into the axial portion of the coolant pool 7. Inlet ports 10A, 10B of cooling ducts 9A, 9B open at the central portions of the partitions 6A, 6B defining the coolant pool 7. The cooling ducts 9A,9B are disposed at both end portions 4a, 4b, of the torque tube 4 along the inner periphery of the torque tube 4.

The cooling duct 9a further extends continuously along the inner peripheral surface of the rotor constructing member 3, and is connected to a coolant discharge pipe 11, along with the other cooling duct 9B. The coolant discharge pipe 11 extends through the hollow shaft 2 to the outside of the rotor.

The rotor shaft, the field winding 5 and the coolant circuit are generally constructed as stated above.

In addition to the general arrangement as above, in order to protect the field winding from the influence of the magnetic flux from the stator side, and in order to preserve the extermely low temperature around the field winding 5 against the heat radiation from the normal temperature side, a cylindrical shielding arrangement is provided around the field winding. The shielding arrangement includes an outer shielding member 12 which acts as an electric damper and as a high frequency electromagnetic shield, and an inner shielding member 14 adapted to function as a radiation heat shield and a low frequency electromagnetic shield. The outer shielding member 12 is positioned outside of the rotor constructing member 3 and is closely fitted thereto. An outer reinforcing body 13 surrounds and is to the outer shielding member 12 fitted to increase the mechanical strength. The inner shielding member 14 is concentrically disposed within an annular space between the field winding 5 and the rotor 3, concentrically therewith.

Outer and inner cylindrical reinforcing bodies 15B and 15A are closely fitted to the outer and the inner peripheral surfaces of the inner shielding member 14, respectively.

The inner and outer reinforcing bodies 15A and 15B, as well as the inner shielding member 14 are supported by the end portions 4a, 4b of the torque tube 4, by means of supporting end plates 16A and 16B.

The superconducting rotor of a dynamo in accordance with the present invention is constructed as stated above.

Although not shown in the drawings, the driving shaft 1 and the hollow shaft 2 are rotatably supported by means of bearings, and a stator consisting of a stator core and a stator winding in the slot formed in the core is provided to surround the outer reinforcing body 13 with a suitable air gap formed therebetween.

An explanation will be made hereinafter as to the way for bringing the field winding 5 into the superconducting condition.

At first, liquefied helium LH is fed, in the direction of the arrows A, through the coolant supply duct 8 into the coolant pool 7. As the rotor is rotated, the resulting centrifugal force acts to spread the liquefied helium LH over the entire inner peripheral surface of the torque tube 4.

Consequently, the field winding 5 is cooled from the inner side of the torque tube 4, and the helium boiled and evaporated through the cooling is allowed to float at the center of the coolant pool 7. Actually, the torque tube 4 is provided with a number of small bores reaching the field winding 5, so as to allow the liquefied helium LH in the pool 7 to get in and out, under the application of the centrifugal force, thereby cooling the field winding 5 to an extremely low temperature.

The gaseous helium floating at the center of the coolant pool 7 is introduced, as shown by arrows B, through the inlet ports 10A, 10B of the coolant ducts 9A, 9B, for cooling the rotor constructing member 3. The gaseous helium is then discharged in the direction of the arrows C through the coolant discharge pipe 11 to be suitably collected.

The field winding 5 is maintained at the extremely low temperature, by feeding and circulating the liquefied helium LH in the above-described manner, through interrupting the heat conducted through the field winding 5, e.g. the driving shaft 1, hollow shaft 2, and the torque tube 4.

The interior of the rotor constructing member 3 is kept at vacuum, and the heat radiated from the stator side is insulated by the inner shielding member 14.

The coolant supply pipe 8, discharge pipe 11 and the power lead 5L pass through the hollow shaft 2, for connection with respective associated stationary parts. More specifically, although not shown in the drawings, the coolant supply pipe 8 and the coolant discharge pipe 11 are connected to the stationary parts through coolant supply and discharge means, while the power lead 5L is connected to the stationary part through a medium of a slip ring.

The field winding 5 is kept at the superconducting state by the supply and circulation of the liquefied helium LH in the above-described manner, and is then suitably excited for starting the generator.

During the running of the generator, the members constituting the rotor, e.g. the inner shielding member 14, are forced to be deformed by the centrifugal and the electromagnetic forces. However, since the inner shielding member 14 is conveniently reinforced by the inner and the outer cylindrical reinforcing bodies closely fitted to the inner and the outer peripheral surfaces thereof, i.e. by the inner reinforcing body 15A and the outer reinforcing body 15B, the distance from the neutral surface of bending to the surface of the inner shielding member 14 is small enough for the total thickness, so that the bending force acting on the inner shielding member 14 due to the magnetic force becomes small enough.

Figure 2:
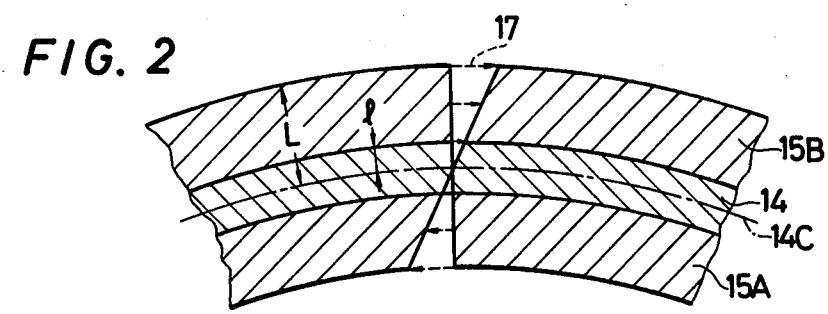
FIG. 2 through FIG. 4 are illustrations explanatory of stress distribution in an inner shielding body equipped with reinforcing bodies, incorporated in an electric machine in accordance with the present invention.

More specifically, as will be seen from FIG. 2, the center of bending, i.e. the neutral surface 14C is positioned at the thickness bisector of the inner shielding member 14, when the inner and the outer reinforcing bodies 15A and 15B are of the same material and thickness. Therefore, the bending stress 17 due to the electromagnetic force is proportional to the distance from the center of surface 14C, and stresses of opposite directions are caused at both sides of the center of neutral surface 14C. Then, the maximum value of the stress 17 is observed on the surfaces of the inner and the outer reinforcing bodies 15A and 15B which are located at a distance L from the center of bending or neutral surface 14C. On the other hand, since the distance L from the center of bending or neutral surface 14C to the surfaces of the inner shielding member 14, i.e. to the intersurfaces of the shielding member 14 and the respective reinforcing bodies, is sufficiently small as compared with the aforementioned distance L, the bending force appearing in the surfaces of the inner shielding member 14 is correspondingly small so that the inner shielding member 14 is fairly protected from being broken. Needless to say, the bending stress 17 can be diminished by making the thickness of the inner shielding member 14 as small as possible.

As has been stated above, the inner shielding member 14 is protected against the centrifugal force by the outer reinforcing body 15B, and against the buckling deformation attributable to the electromagnetic force, by the inner reinforcing body 15A. At the same time, both of the inner and the outer reinforcing bodies 15A and 15B are in combination effective to diminish the bending stress attributable to the electromagnetic force.

FIG. 2 shows a structure preparing only for the bending stress. However, actually, the centrifugal force is always applied, in addition to the electromagnetic force, during the running of the generator.

Figure 3:
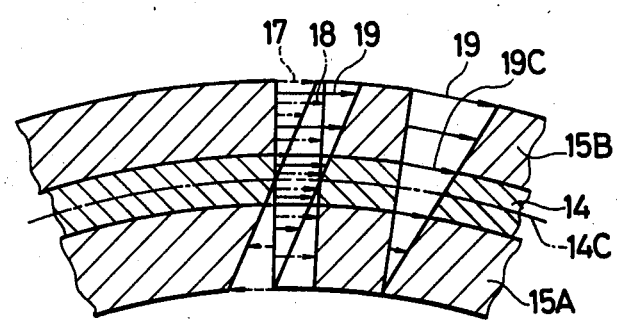

FIG. 3 shows a stress condition on an inner shielding member 14 equipped with the inner and the outer reinforcing bodies 15A, 15B, due to the application of the electromagnetic force during the running of the generator.

Clearly, a centrifugal force is exerted so as to cause uniform distribution of circumferential stress 18 over the entire periphery. As the bending stress 17, due to the electromagnetic force, is added to this uniformly stressed shielding member, the stresses 17 and 18 are superimposed to provide local stresses in the shielding member 14 at portions thereof where they are added positively. Namely, at these portions, a total stress 19 which is the sum of the bending and the circumferential stresses 17 and 18 is applied. This total stress 19 assumes its maximum value at the surface of the outer reinforcing body 15B, and the minimum value at the surface of the inner reinforcing body 15A, in the structure of FIG. 3.

Therefore, the total stress 19 at the surface of the inner shielding member 14 in contact with the outer reinforcing member 15B becomes extremely large as compared with the bending stress 17, which acts against the aim of the present invention to reduce the stress in the inner shielding member 14 for protecting the latter from the centrifugal and the electromagnetic forces.

In the stress distribution as shown in FIG. 3, the bending stress 17 is exerted in the same direction with the circumferential stress 18 at portions above the center of bending or neutral surface 14C, and in the opposite direction to the circumferential stress 18 at portions below the center of bending or neutral surface 14C, so that the total stress is larger at the side closer to the outer reinforcing body 15B than at the side closer to the inner reinforcing body 15A. However, provided that the bending stress 17 acts in the reverse direction to the circumferential stress 18 at the portions above the center of bending or neutral surface 14C and that it acts to follow the circumferential stress 18 at portions below the center of bending or neutral surface 14C of the bending, the total stress 19 is larger at the side closer to the inner reinforcing body 15A than at the side closer to the outer reinforcing body 15B.

In any way, the circumferential stress 18 due to the centrifugal force largely affects the total stress.

Needless to say, this circumferential stress is a tensile stress. For reducing the total stress 19, the circumferential stress 18 as a whole should be made as small as possible.

To this end, according to the embodiment of the present invention, the inner shielding member 14 is made unitary with the inner and the outer reinforcing bodies 15A, 15B, by means of shrink fittings.

Figure 4:
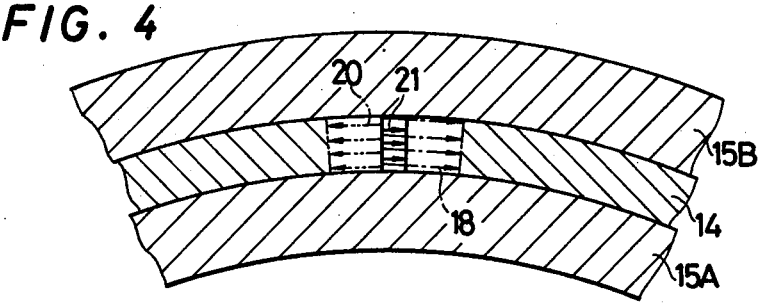
Figure 5:
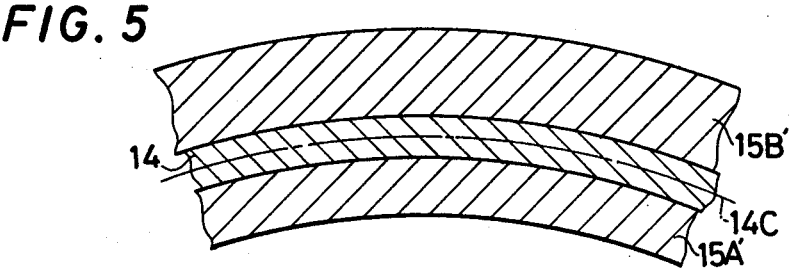
FIG. 5 is a sectional view of an essential part of a different inner shielding body equipped with reinforcing bodies in accordance with the present invention.

More specifically, the inner shielding body 14 is at first supported on the inner reinforcing body 15A. Then, the outer reinforcing body 15B having an inner diameter smaller than the outer diameter of the inner shielding body 14 is fitted at a high temperature. As the outer reinforcing body 15B is cooled to the room temperature, the shrink fitting causes a circumferential compression stress 20 in the inner shield member 14, as shown in FIG. 4.

As the rotor is rotated in this stressed condition, the circumferential tensile stress 18 caused by the centrifugal force is conveniently negated by the circumferential compression stress due to the shrink fitting. Thus, the difference between the tensile and the compression stresses, which is inherently smaller than the tensile stress 18, is exerted on the inner shielding member. The total stress, which is the sum of the reduced circumferential stress and the bending stress 17 of FIG. 2, is accordingly made smaller than the total stress 19 of FIG. 3.

The shrink fitting itself is not exclusive and any other method is acceptable that can bring the inner and the outer reinforcing bodies into close fitting relation with the inner and the outer peripheral surfaces of the inner shielding member 14, so as to cause a circumferential compression stress 20 in the inner shielding member 14.

In the described embodiment, the inner and the outer reinforcing bodies 15A and 15B are of the same material and thickness for positioning the center of the bending or neutral surface 14C thickness at the bisector of the inner shielding member 14, thereby to reduce the bending stress 17. Thus, as far as the center 14C of the bending is positioned on the thicknesswise bisector of the inner shielding member 14, the material and the thicknesses of the inner and the outer reinforcing bodies 15A' and 15B' are selected optionally.

At the same time, the enhanced strength against the bending can be obtained by joining the junction surfaces of the inner shielding member 14 and respective reinforcing bodies 15A, 15B by means of plug welding or soldering.

In the shrink fitting as aforementioned, the fitting work will be facilitated by axially dividing the outer reinforcing body 15B, when the length of the latter is large. However, it is not advisable to divide the inner reinforcing body 15A, because it must withstand the torque applied to the inner shielding body 14 at the transient time.

As the material for the inner shielding member 14, oxygen-free copper having a relatively large yield strength and a sufficiently small electrical resistance at the extremely low temperature of below 40° K. is preferably used.

On the other hand, for the material for the inner and the outer reinforcing bodies 15A and 15B, non-magnetic steel such as stainless steel having a high yield point and which is less likely to exhibit a magnetic saturation in the magnetic field formed by the field winding 5 is preferred.

Fiber reinforced plastics are effectively used for supporting the inner shielding member 14, because of its small specific weight and large Young's modulus which ensures a small deflection due to the centrifugal force.

Further, the outer reinforcing member 15B may be constituted by wire or web wound around the inner shielding member 14.

Having described the invention with a specific embodiment having a reinforced inner shielding member 14, it is to be pointed out that the similar reinforcement can be made also for the outer shielding member 12.

For reinforcing the outer shielding member 12, when the rotor constructing member 3 is to be employed as shown in FIG. 1, the rotor constructing member 3 function as the inner reinforcing body, while an outer reinforcing body 13 is closely fitted around the outer shielding member 12.

It is also to be pointed out that the invention is equally applicable not only to the described double shielded type structure, but also to a single shield structure in which the shielding member is provided only at the outside of the field winding 5.

As has been described, according to the invention, the shield member of inferior mechanical strength is reinforced from its inner and outer sides by respective reinforcing bodies. Therefore, the stress in the shield members due to the centrifugal force and the electromagnetic force is conveniently diminished, so as to avoid the deformation and/or breakdown of the shielding members.

What is claimed is:

1. An electric rotary machine having a superconducting rotor, the electric rotary machine comprising a driving shaft adapted to be connected to a prime mover and having a flange, a hollow shaft confronting said driving shaft at a predetermined gap therebetween and having a flange confronting said flange of said driving shaft, a torque tube bridging the gap between said flanges, a field winding supported on an outer peripheral surface of said torque tube, a non-magnetic holding sleeve adapted for holding an entire peripheral surface of said field winding, a coolant pool formed at an inside of said torque tube, a coolant supply pipe for supplying the coolant to said coolant pool through said hollow shaft, a cylindrical inner shielding member disposed at the outside of said field winding and supported by said torque tube, non-magnetic reinforcing bodies closely fitted to inner and outer peripheral surfaces of said cylindrical inner shielding member, a cylindrical rotor constructing member provided at the outside of said inner shielding member and connected between said flanges, an outer shielding member closely fitted around said rotor constructing member, a non-magnetic reinforcing body fitted closely around said outer shielding member, cooling ducts extending over both ends of said torque tube and said rotor constructing member, a coolant discharge pipe for collecting said coolant from said ducts through said hollow shaft, and a power lead passing through said hollow shaft for supplying said field winding with electric power.

2. An electric rotary machine as claimed in claim 1, wherein said reinforcing bodies are so closely fitted to said shielding members so as to cause circumferential compression stresses in said inner and outer members.

3. An electric rotary machine as claimed in claim 1, wherein centers of bending of the inner and outer shielding members are positioned on thickness bisectors of said inner and outer shielding members, respectively.

4. An electric rotary machine as claimed in claim 3, wherein each of said reinforcing bodies are so closely fitted to the shielding members so as to cause circumferential compression stresses in said inner and outer shielding members, respectively.

5. An electric rotary machine having a driving shaft having a flange and connected to a primary mover, a hollow shaft confronting said driving shaft with a space therebetween and having a flange confronting said driving shaft, a torque tube bridging over said flanges, a field winding supported on the periphery of said torque tube, a non-magnetic holding sleeve for holding the entire peripheral surface of said field winding, a coolant pool formed inside of said torque tube, a coolant supply pipe for supplying said coolant pool with a coolant through said hollow shaft, a cylindrical inner shielding member supported by said torque tube and disposed around said field winding, a cylindrical rotor constructing member disposed around said inner shielding member and connected between said flanges, an outer shielding member closely fitted around said rotor constructing member, cooling ducts extending over both ends of said torque tube and said rotor constructing member, a coolant discharging pipe for collecting said coolant from said cooling ducts through said hollow shaft, and a power lead passing through said hollow shaft for supplying said field winding with electric power; and non-magnetic reinforcing bodies provided at inner and outer peripheral surfaces of at least the inner shielding member.

6. An electric rotary machine as claimed in claim 5, wherein each of said reinforcing bodies is so closely fitted to the shielding member so as to position a center of bending of the shielding member at a thickness bisector of said shielding member.

7. An electric rotary machine as claimed in claim 6, wherein each of said reinforcing bodies is so closely fitted to the shielding member so as to cause a circumferential compression stress in the shielding member.

* * * * *